United States Patent [19]
Röhm

[11] Patent Number: 4,593,588
[45] Date of Patent: Jun. 10, 1986

[54] FACE DRIVE FOR LATHE

[76] Inventor: Günter H. Röhm, Heinrich-Röhm-Str. 50, 7927 Sontheim, Fed. Rep. of Germany

[21] Appl. No.: 633,381

[22] Filed: Jul. 23, 1984

[30] Foreign Application Priority Data

Jul. 23, 1983 [DE] Fed. Rep. of Germany ... 8321303[U]

[51] Int. Cl.⁴ .............................................. B23B 33/00
[52] U.S. Cl. ..................................................... 82/40 R
[58] Field of Search ....................................... 82/40 R

[56] References Cited

U.S. PATENT DOCUMENTS

| | | | |
|---|---|---|---|
| 1,446,063 | 2/1923 | Pratt | 82/40 R |
| 3,273,611 | 9/1966 | Hagquist et al. | 82/40 R |
| 3,323,566 | 6/1967 | Hitt | 82/40 R |
| 3,344,695 | 10/1967 | Hohwart | 82/40 R |

FOREIGN PATENT DOCUMENTS

| | | | |
|---|---|---|---|
| 46997 | 4/1909 | Switzerland | 82/40 R |
| 678885 | 9/1952 | United Kingdom | 82/40 R |
| 740850 | 11/1955 | United Kingdom | |

Primary Examiner—Leonidas Vlachos
Attorney, Agent, or Firm—Karl F. Ross; Herbert Dubno

[57] ABSTRACT

A lathe which rotates a workpiece on centers about an axis, with one end face of the workpiece directed axially backward and having a radially outer periphery generally centered on the axis, has a drive formed by a body axially adjacent the workpiece end face and rotatable about the axis, a motor for rotating the body about the axis, and a face plate rotationally fixed on the body and lying between same and the workpiece end face. A plurality of sets of drive formations or teeth are fixed on the face plate and directed axially forward toward the workpiece. Each set is comprised of a respective plurality of the formations angularly equispaced about the axis and radially equispaced therefrom by a respective radius different from the radius between the formations of any of the other sets and the axis. The formations of each set have axially inner edges lying in a respective plane perpendicular to the axis and offset from the planes of the other sets and the plane of the set with the smallest radius is axially rearmost, that is furthest from the workpiece, while the plane of the set of the largest radius is axially foremost and the remaining planes are graduated therebetween. The face plate is urged axially forward toward the workpiece end face for pressing one set of formations axially inward against the workpiece and rotationally coupling it to the face plate and body. The one set engaging the workpiece is the set having the largest radius that is generally equal to or smaller than the radius of the workpiece periphery.

8 Claims, 3 Drawing Figures

FACE DRIVE FOR LATHE

FIELD OF THE INVENTION

The present invention relates to a face drive for a lathe. More particularly this invention concerns the device that rotates a workpiece in a lathe about an axis by axially engaging a face of the workpiece.

BACKGROUND OF THE INVENTION

Normally one end of a workpiece can be clamped in a multijaw chuck of the type described in my copending patent application Ser. No. 584,400 filed Feb. 15, 1984 and entitled "Air-cooled hydraulic power-chuck actuator", and the other end can be supported on center to rotate the workpiece in a lathe so that it can be turned down, polished, or subjected to whatever machining operation is called for. In fact fairly short workpieces can even be held only at one axial end by such a multijaw chuck.

A long workpiece whose entire outer surfaces must be machined is lathed while supported on centers, that is between coaxially confronting conical points that fit with complementarily shaped but coaxially oppositely opening recesses in the workpiece ends. These points are normally mounted in high-velocity bearings so the workpiece and the points, once fitted axially together, can rotate jointly at high speed about the axis which is stationary.

The workpiece supported on center in this manner must be engaged at at least one of its axial end surfaces by a drive element which is rotated at high speed about the axis while being urged axially against the workpiece. It is absolutely essential that the drive element that actually engages the workpiece do so evenly all around the axis, as any imbalance could bend or deform the workpiece. Hence recourse is normally had to a drive plate formed with workpiece-engagement formations or teeth that are angularly equispaced about the axis and radially equispaced therefrom by a distance equal to the workpiece radius. For maximum efficiency it is necessary that the rotational force be transmitted to the workpiece as far from the rotation axis as possible, which can best be done by making sure the drive teeth engage immediately at or adjacent the outer periphery of the workpiece face.

Thus it is necessary for the shop to have a series of different drive face plates, each corresponding to a different workpiece radius. Valuable storage space and equipment money is tied up in this manner. When workpiece radius changes, it is necessary to remove the current face plate and exchange it for one of the new radius. This represents a loss in lathe time and a cut in worker efficiency, producing a more costly product.

OBJECTS OF THE INVENTION

It is therefore an object of the present invention to provide an improved face-type lathe drive.

Another object is the provision of such a face-type lathe drive which overcomes the above-given disadvantages, that is which can be used efficiently with workpieces of different size without changing any parts or even resetting the drive device.

SUMMARY OF THE INVENTION

A lathe which rotates a workpiece on centers about an axis with one end face of the workpiece directed axially backward and having a radially outer periphery generally centered on the axis, has a drive formed by a body axially adjacent the workpiece end face and rotatable about the axis, a motor for rotating the body about the axis, and a face plate rotationally fixed on the body and lying between same and the workpiece end face. A plurality of sets of drive formations or teeth are fixed on the face plate and directed axially forward toward the workpiece. Each set is comprised of a respective plurality of the formations angularly equispaced about the axis and radially equispaced therefrom by a respective radius different from the radius between the formations of any of the other sets and the axis. The formations of each set have axially inner edges lying in a respective plane perpendicular to the axis and offset from the planes of the other sets and the plane of the set with the smallest radius is axially rearmost, that is furthest from the workpiece, while the plane of the set of the largest radius is axially foremost and the remaining planes are graduated therebetween. The face plate is urged axially forward toward the workpiece end face for pressing one set of formations axially inward against the workpiece and rotationally coupling it to the face plate and body. The one set engaging the workpiece is the set having the largest radius that is generally equal to or smaller than the radius of the workpiece periphery.

Thus according to this invention it is possible to use a single drive assembly for workpieces of different diameters. Each set according to the invention comprises three formations which define a respective plane perpendicular to the axis, so the workpiece can be sure to sit solidly against these drive formations without them canting it.

In the simplest structure of this invention the face plate has a plurality of blades extending radially on the face plate and having front edges projecting axially forward from the face plate and constituting the formations. These front edges define a frustocone with a very obtuse apex angle, so that the drive plate is somewhat self-centering, in addition to being able to engage the very outer periphery of any size of workpiece within its range.

According to another feature of this invention the face plate is formed with a plurality of angularly equispaced and axially forwardly open groove seats and the drive has a plurality of bodies formed with the formations which are axially stepped. In addition the formations of each set are angularly offset from the formations of the adjacent set. In one the simplest arrangement, with three teeth per set, there are at least six such grooves. Thus it is possible to have a radial graduation between adjacent formations that is shorter than the axial length of each body, in a system wherein each body has a respective one of the formations.

Adjustment or original setup is facilitated in this arrangement by holding bars extending along each groove, bearing axially backward against the bodies, and pressing same axially backward against the face plate. Respective screws engaged through these bars into the face plate can secure the individual formations in place.

According to another feature of this invention springs are compressed axially between the plate and body and axially extending guides projecting from the plate or body through the body or plate, respectively, to rotationally couple the plate and body together. Such an arrangement ensures that the force with which the teeth bear axially against the workpiece end face is always the same, since during setup the body plate is simply advanced toward the workpiece until the teeth engage this workpiece and the face plate moves back against the springs.

DESCRIPTION OF THE DRAWING

The above and other features and advantages will become more readily apparent from the following, reference being made to the accompanying drawing in which.

SPECIFIC DESCRIPTION

Figure 1:
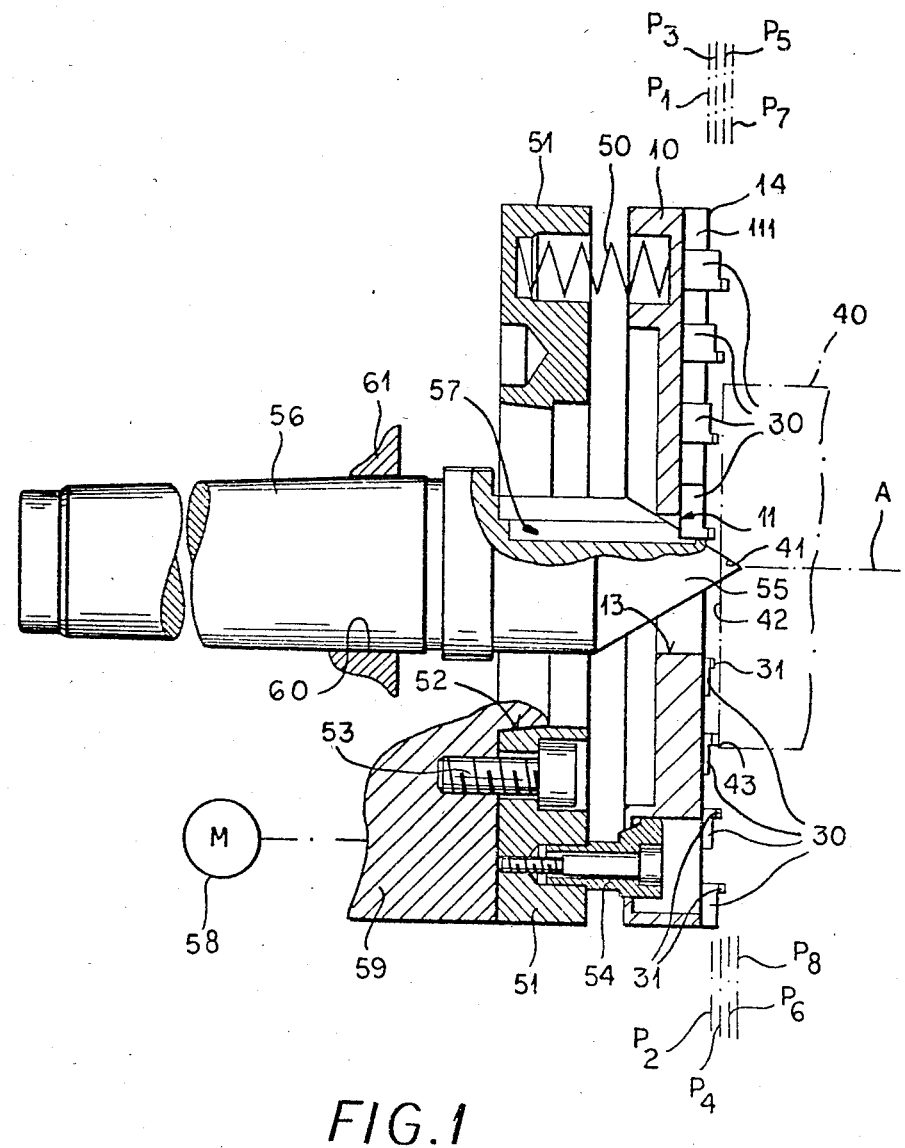
FIG. 1. is a partly schematic axial section through the drive assembly according to the invention.
Figure 2:
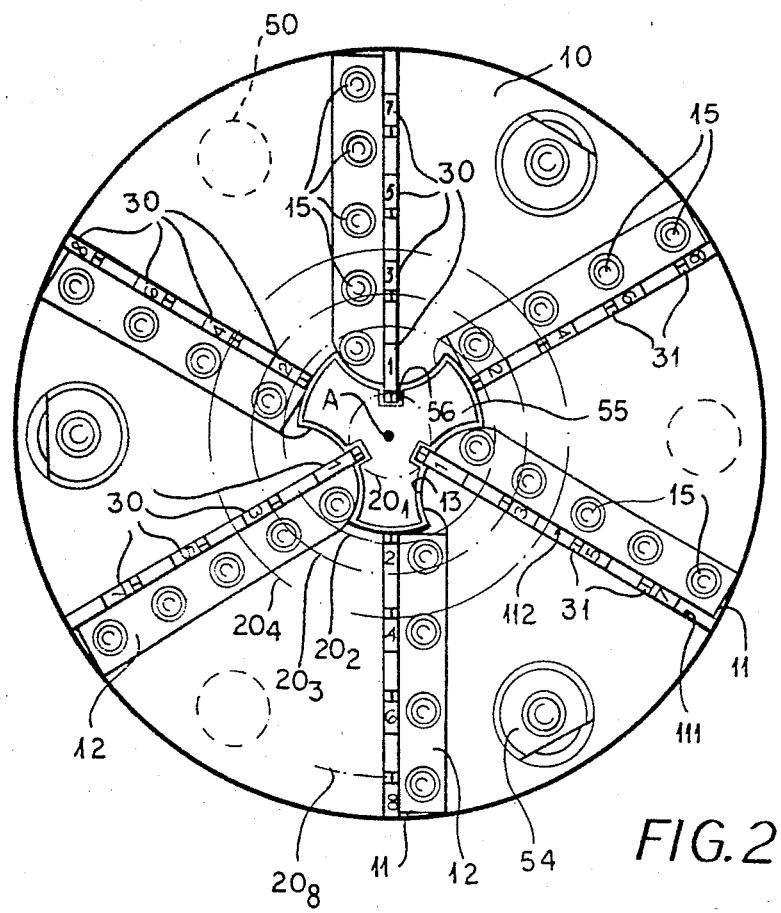
FIG. 2 is an end view taken from the right in FIG. 1.

As seen in FIG. 1 a drive unit basically comprises a circularly annular body plate 51 secured by screws 53 to a drive block 59 that fits within its tapered bore 52 and that is driven by a motor 58 so as to rotate this plate 51 about an axis A. Also centered on this axis A, typically received in the morse-taper seat 60 of a bearing 61, is a live center 56 having a conical point or tip 55 centered on the axis A. In use this tip 55 fits within the complementarily shaped centered recess 41 of a workpiece 40. Such a center 56 is provided at each end of the workpiece 40.

According to this invention a face plate 10 of substantially the same diameter as the plate 51 is carried by axially extending guide pins 54 on the plate 51 so it cannot move angularly relative thereto about the axis A, but so that it can move axially somewhat relative to this plate 51. Springs 50 angularly equispaced about the plates 10 and 51, like the guides 54, urge the plate axially inward, that is toward the right in FIG. 1.

The inner face 14 of the plate 10 is formed with six angularly equispaced and radially extending grooves 11 which open at the outer periphery of the plate 10 and inward into a trilobar central hole 13 through which the axially fluted point 55 can project. Each of these six grooves 11 receives four abutment bodies 30 having axially inwardly directed teeth 31 at their radial inner ends. The teeth may be of sawtooth shape as illustrated or other logical shape to engage and rotationally entrain the workpiece 40. A holddown bar 12 and screws 15 hold these teeth 31 solidly in position on the plate 10, clamped solidly between the flank 111 of the respective groove 11 and the edge 112 of the respective bar 12.

The twenty-four teeth 31 are arranged in eight sets of three each, here numbered 1 through 8 from the axis A out with the appropriate set number actually scribed on each tooth 31. The center point 55 is formed at the base of its flutes with grooves 56 in which the innermost set 1 engages, allowing this point 55 to move axially without interfering with the points 31.

According to this invention the set 1 of teeth 31 lies on an inner circle $20_1$ centered on the axis A, and the sets 2 through 7 lie on respective circles $20_2$ through $20_7$ also centered on the axis A. The radii of these circles $20_1$ through $20_8$ are graduated regularly. The points 31 of the sets 1, 3, 5, and 7 are radially aligned, and offset from the similarly aligned points 31 of the sets 2, 4, 6, and 8. Thus the radial spacing between adjacent circles $20_1$ through $20_8$ can be half that permitted by the actual radial length of the bodies 30.

In addition according to this invention the bodies 30 of the sets 1 through 8 are of increasing axial length, so that the tips of the respective teeth 31 lie in respective planes $P_1$ through $P_8$ that are axially spaced, with the plane $P_1$ furthest back (to the left in FIG. 1) and the plane $P_8$ axially furthest forward. The planes $P_2$ through $P_7$ are equispaced between the planes $P_1$ and $P_8$.

Thus when the workpiece 40, which here has a radius equal to slightly more than that of the circle $20_4$, is engaged at its face 42 axially against the device according to this invention, it will seat firmly on the three teeth 31 of the set 4. The teeth 31 of this set 4 will engage immediately adjacent the outer periphery 43 of the face 42, and the more forward teeth of the sets 5 through 8 will surround but not touch the workpiece 40 whereas the farther back teeth 31 of the sets 1 through 3 are out of contact with the face 42 they confront.

In use the plate 41 is urged forward against the workpiece 40 until the teeth 31 of one of the sets 1 through 8 engage the face 42 of the workpiece 40, and the plate 10 moves backward slightly toward the plate 51, against the force of the springs 40. The points or teeth 31 of the appropriate set therefore bear with controlled axial force on the face 41, ensuring excellent contact for rotary force transmission, while subjecting the workpiece 40 to no bending moment.

Figure 3:
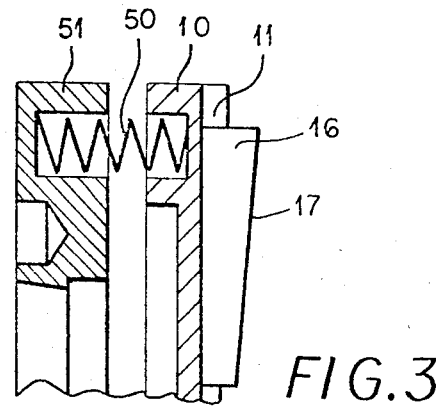
FIG. 3 is a partial view of an alternative embodiment.

The arrangement shown in part in FIG. 3 has at least three identical wedge-shaped blades 16 instead of the sets of points 31. These blades 16 are identical and have front edges 17 all lying on a frustocone centered on the axis A. With this arrangement each location along each edge 17 forms one part of a set made up of the corresponding locations on the other two blades.

With either setup there is no need to change drive assemblies when workpiecee diamter changes. All that is necessary is to mount the workpiece between the lathe centers, then advance the assembly forward into engagement with the workpiece until the springs 50 compress somewhat. The motor 58 is then started to rotate the workpiece. Such a drive unit will leave the entire outer surface of the workpiece free and exposed so it can be completely machined.

I claim:

1. In combination with a lathe provided with means for rotating a workpiece about an axis with one end face of the workpiece directed axially backward and having a radially outer periphery generally centered on the axis, a drive comprising:

a body axially adjacent the workpiece end face and rotatable about the axis;

means for rotating the body about the axis;

a face plate rotationally fixed on the body, formed with a plurality of angularly equispaced and axially forwardly open grooves, and lying between same and the workpiece end face;

means mounting the face plate on the body for joint rotation therewith and axial movement relative thereto;

a plurality of sets of drive formations fixed on the face plate is said open grooves and directed axially forward toward the workpiece, each set being comprised of a respective plurality of the formations angularly equispaced about the axis and radially equispaced therefrom by a respective radius different from the radius between the formations of any of the other sets and the axis, the formations of each set having axially inner edges lying in a respective plane perpendicular to the axis and offset from the planes of the other sets, the plane of the set with the smallest radius being axially rearmost, the plane of the set of the largest radius being axially foremost, and the remaining planes being graduated therebetween;
means for securing the sets of drive formations in the grooves; and
means for urging the face plate axially forward toward the workpiece end face and for thereby pressing one set of formations axially inward against the workpiece and rotationally coupling it to the face plate and body, whereby the one set engaging the workpiece is the set having the largest radius that is generally equal to or smaller than the radius of the workpiece periphery.

2. The face defined in claim 1 wherein the formations of each set are angularly offset from the formations of the adjacent set.

3. The face drive defined in claim 2 wherein there are at least six such grooves and each set includes at least three such formations.

4. The face drive defined in claim 1, further comprising
holding bars extending along each groove bearing axially backward against the sets of drive formations and pressing same axially backward against the face plate.

5. The face drive defined in claim 4 wherein the holding bars are provided with screws securing them to the face plate.

6. The face drive defined in claim 1 wherein the urging means includes springs compressed axially between the plate and body and axially extending guides projecting from the body through the plate.

7. In combination with a lathe provided with means for rotating a workpiece about an axis with one end face of the workpiece directed axially backward and having a radially outer periphery generally centered on the axis, a drive comprising:
a body plate axially adjacent the workpiece end face and rotatable about the axis;
means for rotating the body about the axis;
a face plate lying between the body plate and the workpiece end face and having a front face confronting the workpiece end face and formed with a plurality of groove seats;
a plurality of axially extending guides fixed to one of the plates and extending through the other plate which is slidable on these guides, whereby the plates are rotationally coupled together;
a plurality of sets of drive teeth fixed on the face plate in the groove seats thereof and directed axially forward toward the workpiece, each set being comprised of at least three of the teeth angularly equispaced about the axis and radially equispaced therefrom by a respective radius different from the radius between the teeth of any of the other sets and the axis, the teeth of each set having axially inner edges lying in a respective plane perpendicular to the axis and offset from the planes of the other sets, the plane of the set with the smallest radius being axially rearmost, the plane of the set of the largest radius being axially foremost, and the remaining planes being graduated therebetween;
means for securing the sets of drive teeth in the grooves; and
means including at least one spring braced between the plates for urging the face plate axially forward toward the workpiece end face and for thereby pressing one set of teeth axially inward against the workpiece and rotationally coupling it to the face plate and body, whereby the one set engaging the workpiece is the set having the largest radius that is generally equal to or smaller than the radius of the workpiece periphery.

8. The combination defined in claim 1, wherein the lathe further comprises a center point at the axis engageable through the face plate with the workpiece, the face plate being formed with an axially throughgoing central hole complementarily fitting around the center point.

* * * * *